United States Patent
Shernoff

(10) Patent No.: US 7,072,043 B1
(45) Date of Patent: Jul. 4, 2006

(54) FIBER OPTIC GYROSCOPE FOR CONTINUOUS MEASUREMENT OF LOW AND HIGH RATES OF ROTATION

(76) Inventor: Donald I. Shernoff, 10 Franklin Ave., #4H, White Plains, NY (US) 10601

( * ) Notice: Subject to any disclaimer, the term of this patent is extended or adjusted under 35 U.S.C. 154(b) by 371 days.

(21) Appl. No.: 10/686,215

(22) Filed: Oct. 15, 2003

Related U.S. Application Data

(60) Provisional application No. 60/447,193, filed on Feb. 13, 2003.

(51) Int. Cl.
*G01C 19/72* (2006.01)

(52) U.S. Cl. .................................... 356/460

(58) Field of Classification Search ............. 356/460, 356/462, 463, 464
See application file for complete search history.

(56) References Cited

U.S. PATENT DOCUMENTS

| | | |
|---|---|---|
| 4,545,682 A | 10/1985 | Greenwood |
| 4,687,330 A | 8/1987 | Lefevre |
| 4,773,759 A * | 9/1988 | Bergh et al. ............... 356/460 |
| 4,871,254 A | 10/1989 | Lefevre et al. |
| 5,052,808 A | 10/1991 | Hilby et al. |
| 5,333,047 A | 7/1994 | Toyama et al. |
| 5,355,216 A | 10/1994 | Kim et al. |
| 6,256,101 B1 | 7/2001 | Lo et al. |

OTHER PUBLICATIONS

J. C. Wyant, Phase-Shifting Interferometry (publisher unknown) (1988), pp. 1-39.
J. C. Wyant, Interference and Interferometry (publisher unknown) (2000), pp. 9-1 to 9-12.

* cited by examiner

*Primary Examiner*—Samuel A. Turner
(74) *Attorney, Agent, or Firm*—Law Office of Leo Zucker

(57) ABSTRACT

A fiber optic gyroscope includes a light source and a phase modulator coupled to an optical fiber coil. Light from the source is divided into a pair of first light signals that are directed into opposite ends of the coil to counter propagate through the coil and produce corresponding second light signals the relative phases of which are shifted by the modulator. In one embodiment, a waveform generator defines a modulation waveform so that a determined sequence of five or more phase shifts are set between the second light signals, including shifts of zero degrees, +90 degrees, -90 degrees, +180 degrees and -180 degrees. The second light signals interfere with one another to define a recombined light signal, and measurement signals corresponding to the intensity of the recombined light signal are obtained for each phase shift in the sequence. A rate of rotation of the coil is determined continuously in accordance with the measurement signals and a given interference function.

6 Claims, 5 Drawing Sheets

Open-loop FOG Configuration and Modulation Waveform

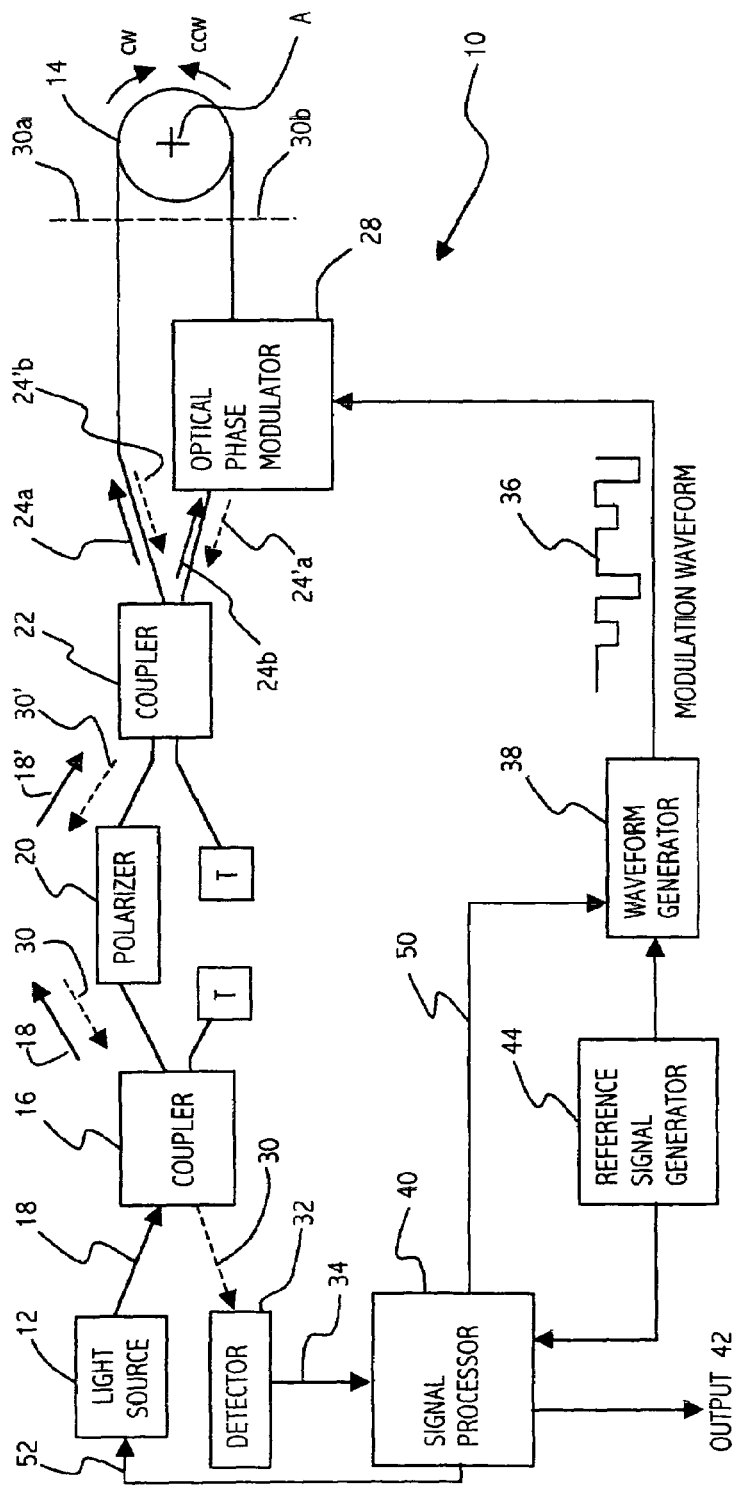
FIGURE 1. Open-loop FOG Configuration and Modulation Waveform

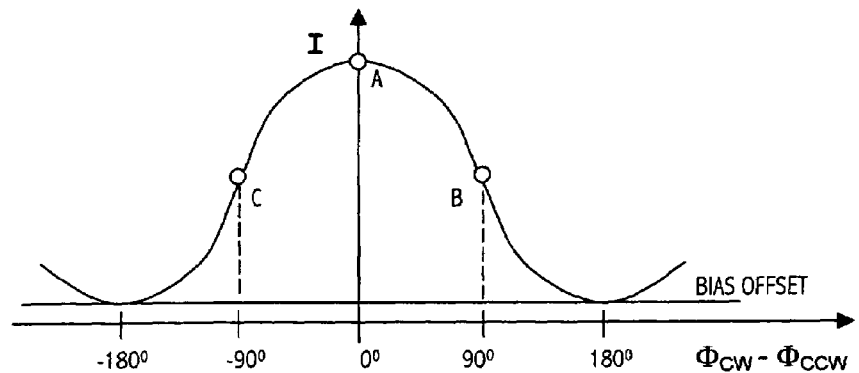
FIGURE 2  3-Point FOG Measurement Locations at Zero Rotation Rate
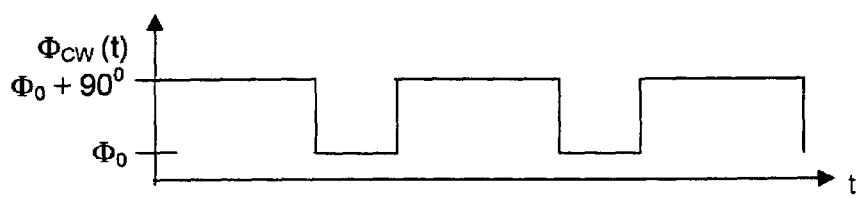
FIGURE 3  3-Point Modulation Waveform
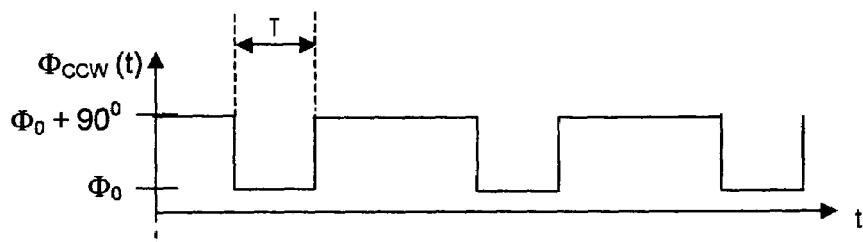
FIGURE 4  Delayed 3-Point Modulation Waveform
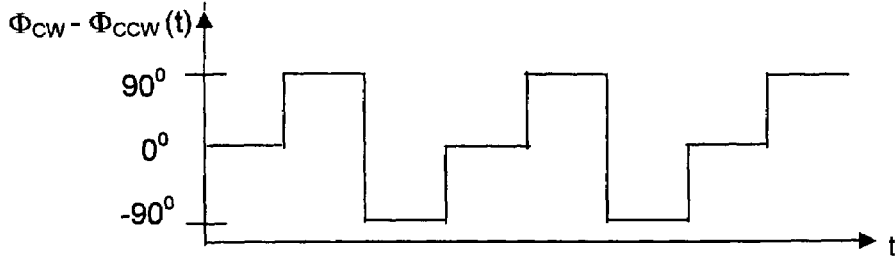
FIGURE 5  Phase Differences Produced by the Modulation

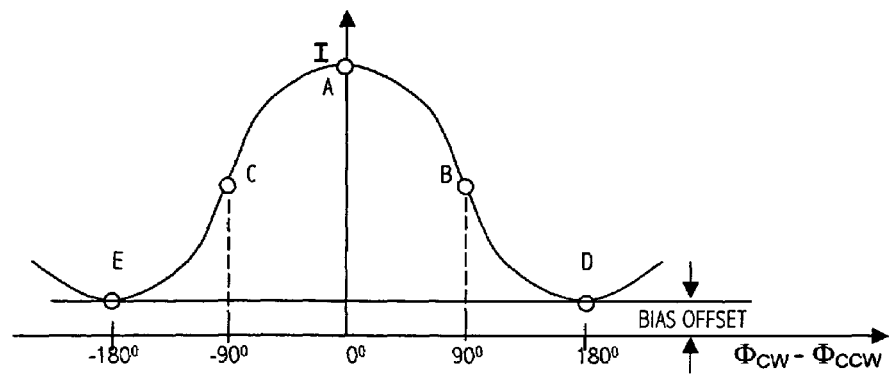
FIGURE 6  5-Point FOG Measurement Locations at Zero Rotation Rate
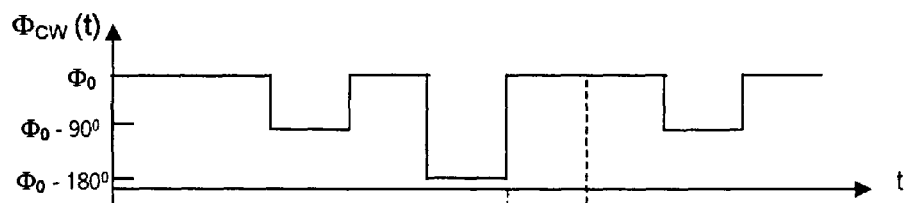
FIGURE 7  5-Point Modulation Waveform
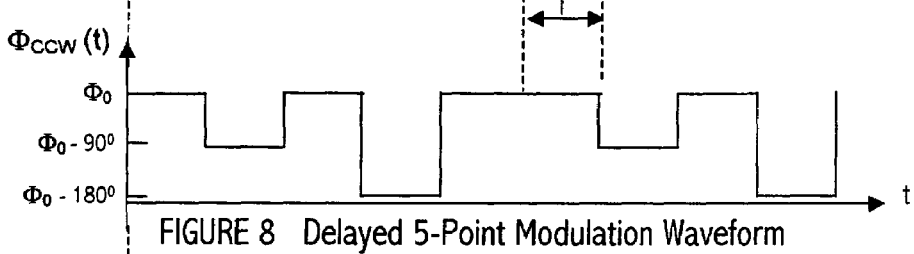
FIGURE 8  Delayed 5-Point Modulation Waveform
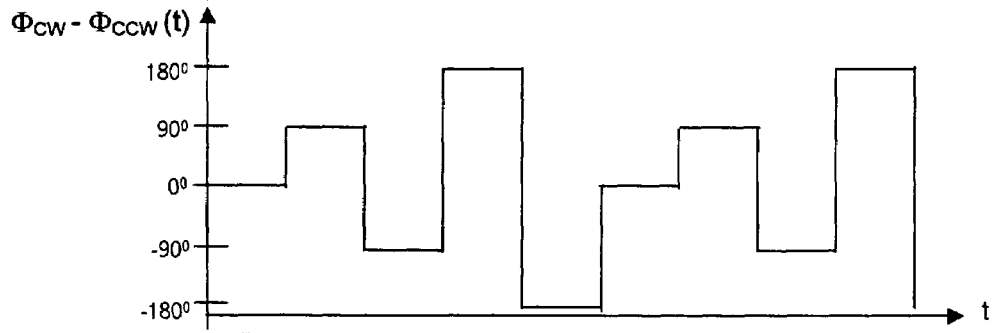
FIGURE 9  Phase Differences Produced by the Modulation

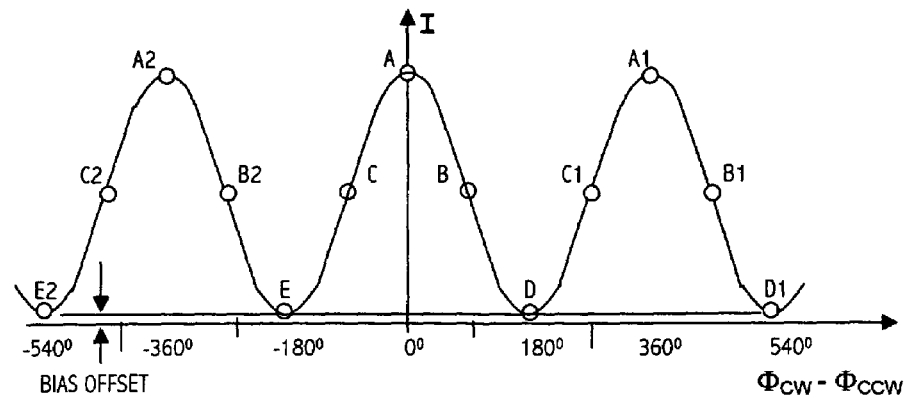
FIGURE 10 13-Point FOG Measurement Locations at Zero Rotation Rate
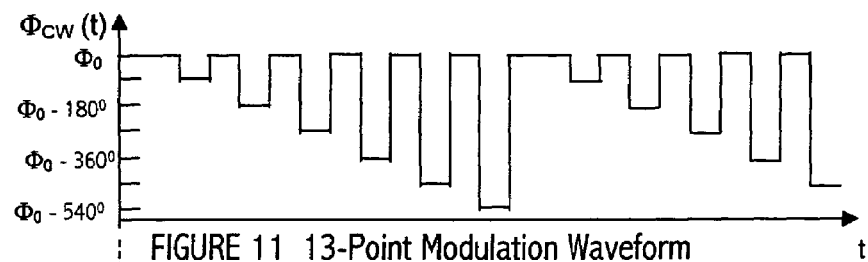
FIGURE 11 13-Point Modulation Waveform
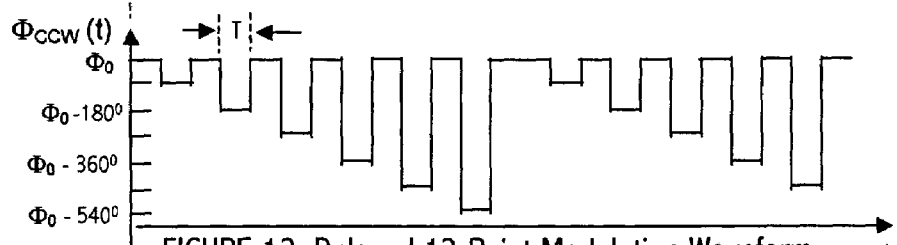
FIGURE 12 Delayed 13-Point Modulation Waveform
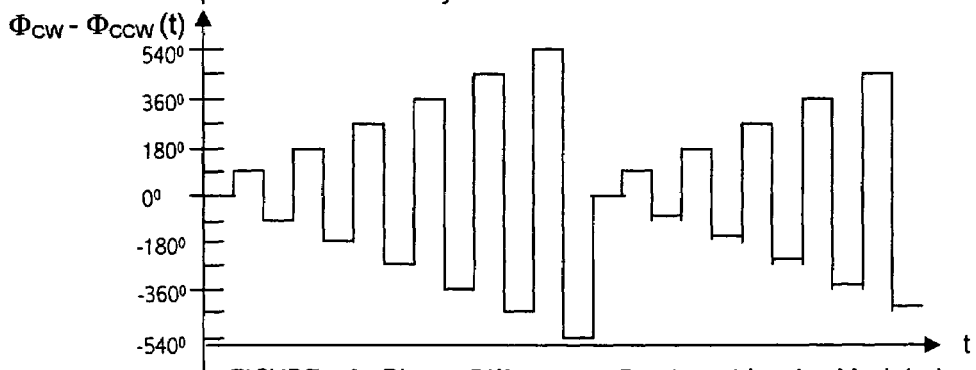
FIGURE 13 Phase Differences Produced by the Modulation

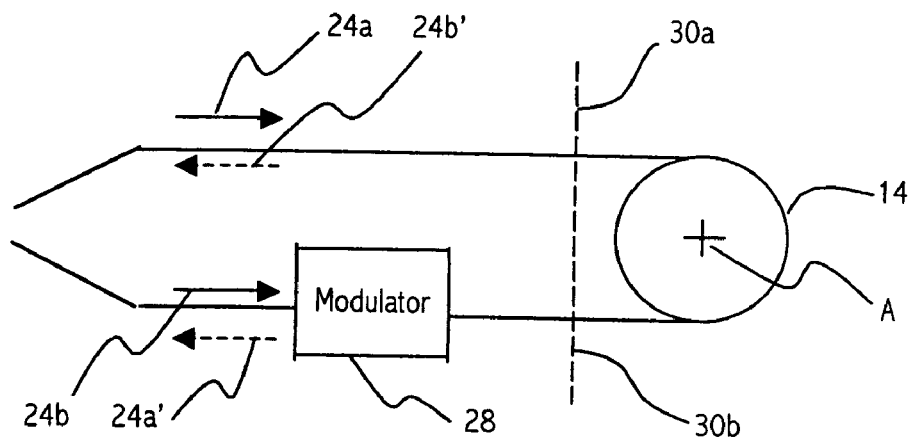
Figure 14  One-sided modulation
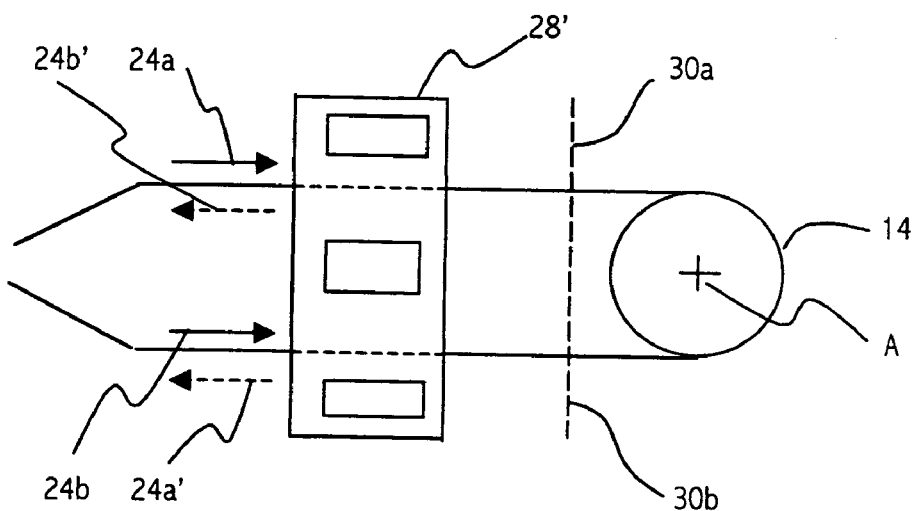
Figure 15  Two-sided modulation

FIBER OPTIC GYROSCOPE FOR CONTINUOUS MEASUREMENT OF LOW AND HIGH RATES OF ROTATION

CROSS REFERENCE TO RELATED APPLICATION

This application claims priority under 35 U.S.C. § 119(e) of U.S. Provisional Patent Application No. 60/447,193 filed Feb. 13, 2003, and entitled "Open-Loop FOG for Continuous Measurement of Rotation up to Extremely High Rates".

BACKGROUND OF THE INVENTION

1. Field of the Invention

The present invention concerns fiber optic gyroscopes, and a method of operating a fiber optic gyroscope.

2. Discussion of the Known Art

Gyroscopes are used in inertial navigation systems as a means for measuring a rate of rotation of an object on which the gyroscope is mounted, with respect to a known axis of the gyroscope. Navigation systems installed on boats and on aircraft use gyroscopes to detect instantaneous changes in the orientation of the vehicle. The systems also typically include accelerometers for detecting changes of the vehicle's speed, and information provided by the gyroscopes and the accelerometers enables the system continuously to determine a present position of the vehicle with respect to a known starting location.

So-called fiber optic gyroscopes or "FOGs" have replaced many of the prior mechanical gyroscope configurations and provide greater accuracy and reliability in high performance commercial and military applications. Operation of a fiber optic gyroscope relies on the so-called Sagnac effect. Basically, light from a common source is divided into separate light beams that are directed to propagate in opposite directions through an optical fiber coil. After exiting from opposite ends of the coil, a relative phase difference between the beams is detected, and the difference is used to determine a rate at which the coil is rotating about its axis. See, H. Lefevre, The Fiber-Optic Gyroscope, Artech House (1993) at pages 5–25, and incorporated by reference.

FOG systems may be classified in either one of two general categories, viz., closed loop or open loop. In a closed loop system, a feedback path is defined so as to maintain the phase difference between the light beams constant after the beams exit the ends of the fiber coil. The amount of feedback needed to maintain the fixed phase relation is therefore indicative of the rate of rotation of the coil about its axis. Closed loop FOG systems have a disadvantage in that the range over which accurate rotation rate measurements can be obtained is limited by the ability to produce sufficient feedback to maintain the constant phase difference as the coil's rotation rate approaches a certain threshold. See, A. Tebo, High-Performance Fiber Optic Gyros and Their Future, Part 2, SPIE—The International Society for Optical Engineering (2000), at pages 2–3.

By contrast, open loop FOG systems calculate the rotation rate by way of amplitude measurements taken along an interference curve which results when the two exiting light beams are recombined. Conventional open loop FOGs have a limited phase measurement range which is bounded by {−90 degrees ≦ R ≦ +90 degrees} on the interference pattern, wherein R is the Sagnac-induced phase shift. As the rotation rate increases and the Sagnac shift approaches the mentioned limits, a determination of the rate becomes much less certain and ambiguities arise. This drawback limits the range over which rate measurements can be obtained reliably with the conventional open loop FOGs. In addition, the FOGs cannot distinguish between a detected rotation rate near zero, and a detected rate that happens to induce a Sagnac phase shift which is more than 360 degrees from zero when the system is initially turned on.

U.S. Pat. No. 5,052,808 (Oct. 1, 1991) discloses a rotation sensing interferometer of the closed loop type. Measurements are taken at points near +90 degrees, −90 degrees, +270 degrees and −270 degrees on an interference curve. Rotation-induced phase shifts then serve to produce feedback for keeping the measurement points at the +90, −90, +270 and −270 degree phases.

U.S. Pat. No. 6,256,101 (Jul. 3, 2001) relates to an open loop FOG for measuring high rates of rotation. The patented gyroscope has a drive circuit operative to adjust the phases of two light beams exiting a fiber optic coil once a measured rotation rate of the gyroscope exceeds a certain threshold.

SUMMARY OF THE INVENTION

According to the invention, a fiber optic gyroscope includes a light source, an optical fiber coil having an axis, and a modulator associated with the coil for shifting phases of light signals directed into and out of the coil in response to a modulation waveform. An optical network receives light of a certain intensity from the source and divides the light into a pair of first light signals. The modulator, coil and network are configured so that the first light signals are directed into opposite ends of the coil and counter-propagate through the coil to define corresponding second light signals the phases of which have been shifted by operation of the modulator.

The network has a stage wherein the phase-shifted second light signals interfere with one another to produce a recombined light signal having an intensity (I) that is a known function of a total phase difference between the second light signals, and the phase difference includes a Sagnac shift (R) produced upon rotation of the coil about its axis. A waveform generator operates to apply the modulation waveform so as to obtain a determined sequence of at least five phase shifts between the second light signals, including shifts of substantially zero degrees, +90 degrees, −90 degrees, +180 degrees and −180 degrees. A detector receives the recombined light signal and produces measurement signals proportional to the intensity of the recombined light signal for each phase shift in the sequence, and a processor produces an output representing a rotation rate of the coil about its axis in accordance with the measurement signals and the known function.

According to another aspect of the invention, a method of determining a rate of rotation of an optical fiber coil about an axis of the coil, includes providing a light source and a modulator for shifting phases of light signals directed into and out of the coil in response to a modulation waveform, and arranging an optical network to receive light from the source and to divide the light into a pair of first light signals. The first light signals are directed to counter-propagate through the coil thus defining corresponding second light signals the phases of which have been shifted by the modulator, and the phase-shifted second lights signals caused to interfere with one another to produce a recombined light signal of an intensity (I) that is a known function of a total phase difference between the second light signals, and the phase difference includes a Sagnac shift (R) produced upon rotation of the coil about its axis.

The modulation waveform is defined to obtain a determined sequence of at least five phase shifts between the second light signals, including substantially zero degrees, +90 degrees, −90 degrees, +180 degrees and −180 degrees. Measurement signals corresponding to the intensity of the recombined signal are produced for each phase shift in the sequence, and a rotation rate of the fiber coil about its axis is determined according to the measurement signals and the known function.

For a better understanding of the invention, reference is made to the following description taken in conjunction with the accompanying drawing and the appended claims.

BRIEF DESCRIPTION OF THE DRAWING

In the drawing:

FIG. 1 is a schematic block diagram of a fiber optic gyroscope system according to the invention;

FIG. 2 is a graph representing an amplitude of a recombined light signal produced by interfering two light signals, and showing three measurement points on the graph;

FIG. 3 is a graph of a modulation waveform for obtaining the three measurement points in FIG. 2;

FIG. 4 is a graph of the modulation waveform in FIG. 3 as delayed by a known coil transit time period T;

FIG. 5 is a graph showing overall phase differences between the two interfering light signals upon application of the modulation waveform of FIG. 3;

FIG. 6 is a graph showing an amplitude of a recombined light signal as in FIG. 2, and showing five measurement points on the graph according to the invention;

FIG. 7 is a graph of a modulation waveform for obtaining the five measurement points in FIG. 6;

FIG. 8 is a graph of the modulation waveform in FIG. 7 as delayed by a known coil transit time period T;

FIG. 9 is a graph showing overall phase differences between two light signals exiting an optical fiber coil in FIG. 1 upon application of the modulation waveform in FIG. 7;

FIGS. 10 to 13 show a scheme for obtaining 13 measurement points along a curve of the amplitude of the recombined light signal, according to the invention;

FIG. 14 is a diagram of a phase modulator and the optical fiber coil in the system of FIG. 1; and FIG. 15 is a diagram of an alternate configuration for the phase modulator and optical fiber coil in FIG. 10.

DETAILED DESCRIPTION OF THE INVENTION

FIG. 1 shows a fiber optic gyroscope (FOG) system 10 according to the invention. The system includes a light source 12 which may be in the form of, for example, a superluminescent diode (SLD), a rare earth doped optical fiber or the like, as known in the art. See Lefevre, supra, at pages 136–40 which are incorporated by reference. The system 10 also includes an optical fiber coil 14 whose axis A is normal to the drawing in FIG. 1. The coil 14 is wound preferably with a single mode fiber whose cladding diameter may be as small as 80 μm. The overall length of the fiber may be 10's of meters to one kilometer or greater, and the diameter of the coil 14 may be several centimeters to as much as ten cm or more, depending on the desired sensitivity of the FOG system 10.

Light energy emitted from the source 12 is directed through a first port of a conventional four port optical coupler 16. A light signal 18 exits from a second port of the coupler 16 and is directed through a conventional light polarizer 20. A polarized light signal 18' leaving the polarizer 20 is directed to a first port of a second optical coupler 22. The coupler 22 operates to divide the light signal 18' into a pair of first light signals 24a, 24b. Unused ports of the optical couplers 16, 22 are terminated in a known manner so that light signals propagating out of the unused ports are absorbed and do not otherwise affect the operation of the system 10.

The two optical couplers 16, 22 and the polarizer 20 define an optical network that receives light energy from the source 12 and divides it into the pair of first light signals 24a, 24b, which are then directed toward the fiber coil 14 and an optical phase modulator 28. The coil 14 and the modulator 28 are configured so that the first light signals enter opposite ends 30a, 30b of the coil and counter-propagate through the coil to produce a corresponding pair of second light signals 24'a and 24'b the phases of which are shifted by operation of the phase modulator 28. Further details of the phase modulator 28 are given below with reference to FIGS. 14 and 15.

As seen in FIG. 1, the second light signals 24'a, 24'b re-enter corresponding ports of the optical coupler 22, and the signals interfere with one another in a known manner to produce a recombined light signal 30 which exits the coupler 22 through the same port that receives the polarized light signal 18'. As is known in the art, the amplitude of the signal 30 varies as a function of a difference in phase between the second light signals 24'a, 24'b. See, e.g., FIGS. 2 and 6. Theoretically, the amplitude is a raised cosine function of the angular phase difference between the second light signals 24'a, 24'b.

The FOG system 10 in FIG. 1 also includes a commercially available detector 32 which is arranged to receive the recombined light signal 30 after it passes through the polarizer 20 and the coupler 16, as shown. The detector 32 operates to produce measurement signals 34 that are proportional to the intensity of the recombined light signal 30, for each of a number of phase shifts that are applied to the second light signals 24'a, 24'b by operation of the phase modulator 28. According to one aspect of the invention, a modulation waveform 36 is defined and applied by a waveform generator 38 to the phase modulator 28, so as to obtain a determined sequence of five or more phase shifts between the pair of second light signals 24'a, 24'b, including shifts of zero degrees, +90 degrees, −90 degrees, +180 degrees and −180 degrees. See FIGS. 6 to 9.

A signal processor 40 in FIG. 1 is constructed and programmed to output a signal 42 representing a rotation rate of the fiber coil 14 about the coil axis A, according to the measurement signals 34 and the interference function or curve. Operation of the waveform generator 38 is synchronized with that of the processor 40 by a reference signal generator 44. Specific details of the processor 40 and the signal generator 44 will be apparent to those skilled in the art in light of the present disclosure.

Operation of the FOG System 10

To understand various features and advantages of the present FOG system 10, operation of a conventional open-loop system is first explained. In the typical system, a modulation waveform is applied to a phase modulator so as to cause measurements to be taken at, for example, points B and C on an obtained interference curve similar to the curve in FIG. 2. As rotation of the optical fiber coil induces a Sagnac phase shift, points B and C move in unison toward the left or the right along the curve. The direction and magnitude of movement of points B and C on the curve depends on the direction and magnitude of rotation of the coil about its axis. The curve of FIG. 2 is part of an interference pattern which may be represented by the raised cosine function:

$$I = I_0[1+\cos(\Phi)] + K \quad \text{(Eq. 1)}$$

wherein

I is the measured light intensity, $2I_0$ is the peak amplitude of the recombined light signal, $\Phi$ is the phase difference between the two recombined beams, and K is a system bias offset.

$I_0$ is proportional to the intensity of the system's light source. Bias offset K is caused by, inter alia, unequal intensities of the counter propagating beams through the coil which leads to incomplete cancellation. The phase difference $\Phi$ has several components:

$$\Phi = R + \Theta nom + \Delta \quad \text{(Eq. 2)}$$

wherein

R is the Sagnac shift, $\Theta nom$ is a nominal modulation phase difference, and $\Delta$ is an error in the modulation phase difference.

Using this formula for $\Phi$ leads to the following expressions for the measurement points B and C:

$$B = I_0[1+\cos(R+\pi/2+\Delta_B)] + K = I_0[1-\sin(R+\Delta_B)] + K \quad \text{(Eq. 3)}$$

$$C = I_0[1+\cos(R-\pi/2+\Delta_C)] + K = I_0[1-\sin(R+\Delta_C)] + K \quad \text{(Eq. 4)}$$

The phase differences $+\pi/2$ and $-\pi/2$ are the result of both the difference between reference level $\Phi_0$ and the offset level $\Phi_0+90°$. Therefore, they must have the same magnitude. In addition, the error terms $\Delta_B$ and $\Delta_C$, which would result from an error in the offset level, will be equal in magnitude and opposite in sign.

$$\Delta_C = -\Delta_B \quad \text{(Eq. 5)}$$

In general, the error terms $\Delta_B$ and $\Delta_C$ are small. Therefore, the cosines of these angles may be set to unity, and the sines of the angles are approximated by the angles themselves. Utilizing these approximations, equations (3) and (4) can be restated as:

$$B = I_0[1-\sin(R) - \Delta_B \cos(R)] + K \quad \text{(Eq. 6)}$$

$$C = I_0[1+\sin(R) - \Delta_B \cos(R)] + K \quad \text{(Eq. 7)}$$

Subtracting equation (6) from equation (7) gives:

$$C - B = 2I_0 \sin(R) \quad \text{(Eq. 8)}$$

This can be solved for the Sagnac phase shift R:

$$R = \sin^{-1}\left(\frac{C-B}{2I_0}\right) \quad \text{(Eq. 9)}$$

The actual rate of rotation $\Omega$ of the coil is calculated by multiplying R by a predetermined scale factor. The rate output of the conventional open loop FOG is therefore insensitive to phase shift errors to the first order. But it has the ambiguity problem mentioned earlier, and it is sensitive to variations in the light source intensity.

A 3-point open loop FOG

It is possible to improve on the conventional FOG described above, by implementing an additional measurement point A at zero phase shift as seen on the curve in FIG. 2. The three points A, B and C will enable the system to overcome the ambiguity problem at $R = \pm 90°$. Note that FIG. 2 shows the positions of the points when the rate of rotation of the coil is zero. Upon coil rotation, the additional point A will move toward a steeper part of the cosine curve, as the original two points B, C approach flatter parts of the curve, so the sensitivity will not go to zero. FIG. 3 illustrates a modulation waveform suitable for obtaining the measurement points A, B and C on the curve of FIG. 2. The equation for the additional point A is given by:

$$A = I_0[1+\cos(R)] + K \quad \text{(Eq. 10)}$$

One can now form the expression $2A-(B+C)$:

$$2A - (B+C) = I_0 \cos(R)[1+\Delta_B] \quad \text{(Eq. 11)}$$

Dividing equation (8) by equation (11), one obtains:

$$\frac{C-B}{2A-(B+C)} = \frac{\sin(R)}{\cos(R)[1+\Delta_B]} = \frac{\tan(R)}{[1+\Delta_B]} \quad \text{(Eq. 12)}$$

Solving the above equation for R yields:

$$R = \tan^{-1}\left[\frac{(1+\Delta_B)(C-B)}{2A-(B+C)}\right] \quad \text{(Eq. 13)}$$

Equation (13) for the Sagnac shift R does not have an ambiguity, and it is independent of the bias term K and the light source intensity. It is, however, sensitive to the phase shift error $\Delta_B$. This problem is addressed by increasing the number of measurement points to five or more, as shown below.

A 5-point open-loop FOG

Two additional measurement points D and E, at phase shifts of $+180°$ and $-180°°$, are provided as shown on the curve of FIG. 6. Note that FIG. 6 depicts the locations of all five measurement points A to E on the intensity curve in the absence of coil rotation (i.e., for a zero rate of rotation about the axis A of coil 14 in FIG. 1). The system 10 thus has measurement points at phase shifts of 0°, +90°, −90°, +180° and −180° which enable it to overcome the mentioned phase shift error problem, as shown below.

The equations of the two additional measurement points are:

$$D = I_0[1+\cos(R+\pi+\Delta_D)] + K = I_0[1-\cos(R+\Delta_D)] + K \quad \text{(Eq. 14)}$$

$$E = I_0[1+\cos(R-\pi+\Delta_E)] + K = I_0[1-\cos(R+\Delta_E)] + K \quad \text{(Eq. 15)}$$

One modulation waveform suitable for obtaining the five points A to E is shown in FIG. 7. FIGS. 7 and 8 show the effects of the modulation waveform on the two light beams which are directed to counter propagate through the coil 14, wherein the time interval T is the time for either beam to propagate from one end to the opposite end of the coil, i.e., the coil "transit time". As seen in FIG. 8, each phase difference is applied for a duration equal to the time interval T. FIG. 9 shows the resulting order of phase differences obtained between the two beams, viz., 0°, +90°, −90°, +180° and −180°.

The phase differences $+\pi/2$ and $-\pi/2$ are the result of both the difference between reference level $\Phi_0$ and the offset level $\Phi_0-90°$. Therefore, they have the same magnitude. In addition, the angular error terms $\Delta_B$ and $\Delta_C$, which would result from an error in the offset level, are equal in magnitude and opposite in sign. Similarly, the +π and −π phase differences are the result of both the difference between reference level $\Phi_0$ and the offset level $\Phi_0$−180°. Therefore, they will have a common magnitude, and the error terms $\Delta_D$ and $\Delta_E$, will be equal in magnitude and opposite in sign.

$$\Delta_C = -\Delta_B \qquad \text{(Eq. 16)}$$

$$\Delta_E = -\Delta_D \qquad \text{(Eq. 17)}$$

The phase shift angular error terms $\Delta_B$, $\Delta_C$, $\Delta_D$, and $\Delta_E$ are usually small. Therefore, the cosines of these angles may be set to unity, and the sines of the angles are approximated by the angles themselves.

The Sagnac shift R is then calculated by combining the above equations for A, B, C, D, and E.

$$\frac{C-B}{D+E-2A} = \frac{2I_0 \sin(R)}{-4I_0 \cos(R)} = -\frac{1}{2}\tan(R) \qquad \text{(Eq. 18)}$$

$$R = \tan^{-1}\left(\frac{2(B-C)}{D+E-2A}\right) \qquad \text{(Eq. 19)}$$

$$R = \cot^{-1}\left(\frac{D+E-2A}{2(B-C)}\right) \qquad \text{(Eq. 20)}$$

Equation (19) applies when the magnitude of tan (R)≦1. When the magnitude of cot (R)≦1, equation (20) applies. To first order, the system 10 is insensitive to optical phase shift errors. The rate of rotation Ω is calculated by multiplying R by the predetermined scale factor. The rotation output is continuous over a wide range of rate-induced phase shifts, and is not sensitive to variations in light intensity. The five measurements can also be combined to calculate the peak signal intensity, signal bias, the common offset of the +90° and −90° phase shifts, and the common offset of the +180° and −180° phase shifts.

The present system 10 operates smoothly and continuously over phase changes that span multiple interference fringes. FIG. 6 shows that, for a zero rate of rotation, points B and C are in the most sensitive region of the intensity curve. As rotation causes the points to move toward relatively flat regions of the curve, the points A, D and E move toward regions having a higher slope so as to maintain the sensitivity of the system always at satisfactory levels.

The equations for measurement points A, B, C, D and E can also be solved for the error term $\Delta_B$:

$$\frac{B+C-2A}{D+E-2A} = \frac{-I_0\cos(R)[1+\Delta_B]}{-2I_0\cos(R)} = \frac{1+\Delta_B}{2} \qquad \text{(Eq. 21)}$$

$$\Delta_B = \frac{2(B+C-2A)}{D+E-2A} - 1 \qquad \text{(Eq. 22)}$$

Equation (22) is valid for non-zero values of cos (R); that is, when R is not an odd multiple of π/2. This has only a small effect on the performance of the system because under those circumstances, points B and C are in the flat regions of the intensity curve and the gyroscope is insensitive to the precise phases of the points. Further, the equation is valid when R is near zero and the rate calculation is most sensitive to points B and C. System behavior near a zero rotation rate is critical for accurate determinations of vehicle pitch and yaw, and may then be computed when the points B and C are in the steep slope region of the curve.

The equations for the points A, B, C, D and E can also be solved for the error term $\Delta_D$:

$$\frac{D-E}{C-B} = \frac{I_0 \Delta_D \sin(R)}{I_0 \sin(R)} = \Delta_D \qquad \text{(Eq. 23)}$$

Equation (23) is valid when R is not zero or an odd multiple of π. This has only a small effect on the performance of the system because under those circumstances, points D and E are in relatively flat regions of the intensity curve and the system 10 is insensitive to their precise phases. Importantly, the equation is valid for those values of R at which the system is sensitive to points D and E.

For monitoring purposes, the bias term K and the amplitude of the cosine function $I_0$ can be calculated from the equations for points A, B, C, D and E:

$$K = (D+E+2A-2I_0)/4 \qquad \text{(Eq. 24)}$$

$$I_0 = \sqrt{[(D+E-2A)/4]^2 + [(C-B)/2]^2} \qquad \text{(Eq. 25)}$$

The modulation waveform shown in FIGS. 5 and 7 is operative to generate an optical phase shift sequence, in the stated order, of 0°, +90°, −90°, +180° and −180° to obtain the five measurement points A to E on the intensity curve of FIG. 6. This waveform is representative of a family of waveforms capable of creating the same phase shift values, but in different orders.

The signal processor 40 is constructed and programmed to use the relationships derived above to calculate:

1. Rotation rate (R),
2. Peak light source signal intensity $2I_0$,
3. Signal bias K,
4. The common offset of the +90° and −90° phase shifts, and
5. The common offset of the +180° and −180° phase shifts.

The processor 40 may also be configured to produce a modulation correction signal 50 that is supplied to the waveform generator 38 so as to adjust the offset levels and drive the modulation errors toward zero. Peak signal intensity may be measured continuously, and, if necessary, the intensity of the light source 12 can be stabilized by way of a feedback loop 52 in FIG. 1. Processor 40 may also utilize the calculated values of $\Delta_B$ and $\Delta_D$ to correct an initially calculated rotation rate prior to producing its output at 42.

A significant feature of the modulation waveform in FIG. 7 is that all of the nominal phase shifts are obtained in pairs by using voltage offsets from a common reference voltage $V_0$ produced by the generator 38. For example, referring to FIG. 9, a +90° total optical phase difference is produced when the modulation voltage changes from $V_0$ to $V_{90}$. A phase change of −90° occurs when the modulation voltage returns from $V_{90}$ back to $V_0$. As a result, the phase shifts are always generated in pairs, e.g., the −90° shift occurs immediately after the +90° shift. Any errors in the two phase shifts will be equal and opposite since they are both proportional to the difference between the same two voltages. This means that each pair of measurements has only one phase error and can be used to solve or eliminate one of the five unknowns R, $I_0$, K, $\Delta_B$ and $\Delta_D$ in the intensity equations.

The use of one offset to generate a pair of phase shifts also makes it possible for the system to adjust and reduce phase shift errors by way of feedback. An adjustment of the offset voltage will correct two phase shift errors simultaneously without introducing any errors in the remaining phase shifts. It is possible to generate the same array of five measurement points A to E with modulation waveforms that do not have this feature. For example, the +90° phase shift might be produced by a step from $V_0$ and $V_{90}$, while the −90° shift might be generated by a step from $V_{180}$ to $V_{90}$. In such a case, the phase shift errors at +90° and −90° will not always be equal and opposite, and an adjustment of $V_{180}$ will affect the +90° phase shift.

Another feature of a modulation waveform such as that shown in FIG. 7 is the inclusion of the zero phase shift measurement at point A. The point may be generated by allowing the modulation voltage level to have a duration of 2T, such as seen at the leading portion of FIG. 7, wherein T is the transit time of the fiber-optic coil 14. The measurement contains no phase shift error to the extent that the voltage level remains constant. Thus, the measurement generates information without introducing additional error.

System Turn-on Ambiguity and a Solution

At initial turn-on of the system 10, there is a possibility that the rotation rate R is non-zero and high enough to shift the measurement points A–E relatively far from the central portion of the interference pattern in FIG. 6. This may give rise to an ambiguity in an initial determination of the Sagnac-induced phase shift in multiples of ±360° and, thus, introduce a large degree of uncertainty in the initial determination of the rotation rate R.

According to another aspect of the invention, the ambiguity may be resolved by the use of an expanded, 13-point measurement sequence. The interference pattern has a series of intensity peaks that are symmetrical about a zero degree phase shift. The central peak or fringe has the largest peak amplitude, and the side peaks gradually diminish in amplitude as a function of their distance from the central peak. Thirteen measurements spaced 90° apart are taken over a range of three adjacent fringes as depicted in FIG. 12, and the amplitude of each fringe then calculated. By comparing the calculated amplitudes with theoretical or measured amplitudes of the peaks of the fringe pattern, the actual locations of those fringes being measured can be determined. If the phase modulator 28 lacks sufficient range to span three fringes, the measurements can be performed over a reduced range and applied using modified equations.

The amplitudes of the intensity peaks can be measured and stored during a system calibration routine. The measurements of the three fringes may then be compared to the stored values so as to determine, unambiguously, on which fringe the measurement points are located.

FIGS. 10 to 13 illustrate the use of an expanded modulation waveform that may be applied to the phase modulator 28 in FIG. 1 used during an initial system turn-on period. The waveform is shown, for example, in FIG. 11. The resulting optical phase shift sequence of 0°, +90°, −90°, +180°, −180°, +270°, −270°, +360°, −360°, +450°, −450°, +540° and −540° is shown in FIG. 13, and the locations of the measurement points on the intensity curve in the absence of rotation is shown in the center fringe of FIG. 10 as points A to E. If the initial rotation rate is near zero, then $I_0$ (see Eq. 25) will be larger than $I_+$ and $I_-$; and $I_+$ and $I_-$ will be nearly identical in size.

In FIG. 10, $I_0$ may be calculated by using equation (25). $I_+$ and $I_-$ are given by the similar equations:

$$I_+ = \sqrt{[(D + D1 - 2A1)/4]^2 + [(C1 - B1)/2]^2} \quad \text{(Eq. 26)}$$

$$I_- = \sqrt{[(E2 + E - 2A2)/4]^2 + [(C2 - B2)/2]^2} \quad \text{(Eq. 27)}$$

The expanded waveform is preferably used only during the initial turn-on period. It will allow the system 10 to determine on which interference fringe the measurement points reside, and thus eliminate the mentioned 360° ambiguity. Once the ambiguity is resolved, the five-point modulation waveform of FIG. 7 may be implemented.

FIG. 14 shows the optical phase modulator 28 coupled to one side of the optical fiber coil 14, as in FIG. 1. The configuration is known as "one-sided" modulation since each of the light signals 24a, 24b passes through the modulator once to be phase-shifted in response to the modulation waveform 36, and then to be directed back to the optical coupler 22 where the phase-shifted signals 24'a, 24'b are recombined with one another.

FIG. 15 shows an alternate arrangement of a phase modulator 28' and the fiber coil 14 in a "two-sided" configuration. Each of the light signals 24a, 24b enters a corresponding port of the modulator 28' which may comprise a single crystal having a center electrode (not shown) to which the modulation waveform is applied. A voltage applied between the center electrode and two outer electrodes acts to produce equal but opposite phase shifts to the signals 24a, 24b, and the signals are phase-shifted twice by the modulator 28' by the time they return to the coupler 22 to be recombined. It will be understood that when using the configuration of FIG. 15, the actual voltage levels required of the modulation waveform 36 to obtain the desired phase shifts may be reduced by a factor of two as compared with the levels required for the configuration of FIG. 14.

It will be appreciated that the system 10 is capable of resolving measurement ambiguities while maintaining high sensitivity for Sagnac induced phase shifts ranging over multiple interference fringes. The system is therefore able to measure rotation rates continuously up to extremely high values at which measurement accuracy does not degrade. The rate calculation is independent of variations in the light source intensity, this eliminating a major source of error. The rate output 42 is also independent of optical phase shift errors to first order.

Optical phase shift variations are calculated continuously from the five data points A to E, using the analytical expressions developed above. Phase shift errors may be reduced by way of feedback to adjust the modulation levels without interrupting rotation measurements, and the error measurements may themselves be used for correction of an initially calculated rate output. Signal intensity may be measured continuously. An analytical expression for the signal intensity has been developed and may be used to stabilize the intensity of the light source 12 by way of feedback. An ambiguity at initial system turn-on may be eliminated by measurements taken over a range of three fringes, and by calculating the amplitude of each fringe. By comparing the amplitudes with theoretical or measured amplitudes of the peaks, the initial phase shift can be determined within a multiple of ±360°. The system 10 does not require a trade-off between sensitivity and rate range, and it provides a FOG having a high rate capability as well as high sensitivity and accuracy.

The present FOG system 10 overcomes certain limitations of conventional open loop FOG systems that rely on only two measurement points to obtain a continuous indication of rate of rotation. The use of more than two measurement points as disclosed herein enables the system to eliminate so-called dead zones, constantly monitor various sources of error, and to provide means for controlling or compensating for such errors while performing rate calculations. The rate signals output from the processor 40 are independent of variations in the intensity of the light source 12 to the first order. The output signals are also independent of optical phase shift errors to the first order. Measurement accuracy does not degrade at high rates of rotation, and sensitivity to rotation remains high for rate-induced shifts ranging over multiple interference fringes.

Phase shift variations are monitored continuously over the entire range of the system 10, and such variations may be corrected by way of feedback without interrupting the rotation rate measurements. Phase shift measurements may also be used to correct the calculated rate output. Also, the system electronic bias K may be continuously measured and used to monitor general system performance.

While the foregoing description represents a preferred embodiment of the invention, it will be obvious to those skilled in the art that various changes and modifications may be made without departing from the spirit and scope of the invention pointed out by the following claims.

I claim:

1. A method of determining a rate of rotation of an optical fiber coil about an axis of the coil, comprising:
   providing a light source;
   providing a phase modulator for shifting the phases of light signals directed into and out of the coil, in response to a modulation waveform;
   arranging an optical network for receiving light of a certain intensity from the light source and for dividing the light into a pair of first light signals;
   directing the first light signals to counter-propagate through the coil thus defining a corresponding pair of second light signals the phases of which have been shifted by the phase modulator;
   interfering the phase-shifted second light signals with one another to produce a recombined light signal having an intensity (I) that is a known function of a total phase difference between the second light signals, and the phase difference includes a Sagnac shift (R) produced when the coil rotates about said axis;
   defining the modulation waveform to obtain a determined sequence of at least five phase shifts between the pair of second light signals, including shifts of substantially zero degrees, +90 degrees, −90 degrees, +180 degrees and −180 degrees;
   producing measurement signals corresponding to the intensity of the recombined light signal for each overall phase shift in said sequence; and
   determining a rotation rate of the optical fiber coil about said axis according to the measurement signals and said known function.

2. The method of claim 1, including defining the intensity of the recombined light signal as;

$$I = I_0[1+\cos(\Phi)] + K,$$

wherein:
   $2I_0$=peak intensity of the recombined light signal,
   $\Phi$=total phase difference between the second light signals, and
   K=a system bias offset.

3. The method of claim 1, including defining the total phase shift ($\Phi$) between the second light signals as;

$$\Phi = R + \Theta nom + \Delta,$$

wherein:
   R=Sagnac phase shift,
   $\Theta$nom=nominal modulation phase difference at a given measurement point, and
   $\Delta$=phase shift error at the given measurement point.

4. The method of claim 1, including determining the Sagnac shift (R) according to the relation;

$$R = \tan^{-1}\{[2(B-C)]/[D+E-2A]\} \text{ when } |\tan(R)| \leq 1, \text{ and}$$

$$R = \cot^{-1}\{[D+E-2A]/[2(B-C)]\} \text{ when } |\cot(R)| \leq 1,$$

wherein:
   A =value of measurement signal with zero phase shift set by the phase modulator;
   B=value of measurement signal with +90 degree phase shift set by the phase modulator;
   C=value of measurement signal with −90 degree phase shift set by the phase modulator;
   D=value of measurement signal with +180 degree phase shift set by the phase modulator; and
   E=value of measurement signal with −180 degree phase shift set by the phase modulator.

5. The method of claim 4, including defining the modulation waveform so that the phase modulator obtains the phase shifts between the second light signals at substantially zero degrees, +90 degrees, −90 degrees, +180 degrees and −180 degrees, in the stated order.

6. The method of claim 1, including defining the modulation waveform so that the sequence of phase shifts set by the phase modulator between the second light signals includes a number of pairs of phase shifts, and the phase shifts of each pair have equal value and opposite sign.

* * * * *